(12) United States Patent  
Wang

(10) Patent No.: US 9,262,899 B2
(45) Date of Patent: Feb. 16, 2016

(54) METHOD, DEVICE AND SYSTEM FOR IMPLEMENTING VIDEO RECORDING RETRIEVAL

(71) Applicant: Huawei Technologies Co., Ltd., Shenzhen (CN)

(72) Inventor: Feng Wang, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 47 days.

(21) Appl. No.: 14/140,334

(22) Filed: Dec. 24, 2013

(65) Prior Publication Data

US 2014/0105577 A1    Apr. 17, 2014

Related U.S. Application Data

(63) Continuation of application No. PCT/CN2012/080319, filed on Aug. 17, 2012.

(30) Foreign Application Priority Data

Feb. 10, 2012    (CN) .......................... 2012 1 0030077

(51) Int. Cl.
*H04N 9/80* (2006.01)
*G08B 13/196* (2006.01)
*H04N 5/76* (2006.01)
*H04N 9/82* (2006.01)
*G11B 27/32* (2006.01)
*G11B 27/10* (2006.01)

(52) U.S. Cl.
CPC .... *G08B 13/19673* (2013.01); *G08B 13/19671* (2013.01); *G11B 27/10* (2013.01); *G11B 27/322* (2013.01); *H04N 5/76* (2013.01); *H04N 9/8205* (2013.01); *G08B 13/19695* (2013.01)

(58) Field of Classification Search
CPC .................. G08B 13/19645; G08B 13/19665
USPC .......................................................... 386/241
See application file for complete search history.

(56) References Cited

U.S. PATENT DOCUMENTS 5,526,133 A      6/1996  Paff
2003/0044168 A1* 3/2003  Matsukawa ................... 386/117
(Continued)

FOREIGN PATENT DOCUMENTS

CN          1365086 A      8/2002
CN        101431666 A      5/2009
(Continued)

OTHER PUBLICATIONS

International Search Report received in Application No. PCT/CN2012/080319 mailed Nov. 29, 2012, 13 pages.

*Primary Examiner* — Hung Dang
*Assistant Examiner* — Girumsew Wendmagegn
(74) *Attorney, Agent, or Firm* — Slater & Matsil, L.L.P.

(57) ABSTRACT

Embodiments of the present invention disclose a method, a device, and a system for implementing video recording retrieval. The method includes receiving an alarm event, where the alarm event includes a device identifier of an alarm device and an alarm occurrence time. The method further includes generating a video recording index of a video recording corresponding to the alarm event according to the alarm event, where the video recording index includes video recording time information and video recording acquisition information. The method also includes generating a video recording bookmark of the video recording corresponding to the alarm event according to the alarm event, where the video recording bookmark includes a camera identifier and the alarm occurrence time.

10 Claims, 2 Drawing Sheets

(56) References Cited

U.S. PATENT DOCUMENTS

| | | |
|---|---|---|
| 2008/0056667 A1 | 3/2008 | Fujiyama et al. |
| 2008/0259173 A1* | 10/2008 | Yahata ................. 348/220.1 |
| 2010/0271478 A1 | 10/2010 | Oya |
| 2011/0060742 A1* | 3/2011 | Heller ................. G06F 17/3002 707/741 |

FOREIGN PATENT DOCUMENTS

| | | |
|---|---|---|
| CN | 101493838 A | 7/2009 |
| CN | 101902620 A | 12/2010 |
| CN | 102244758 A | 11/2011 |
| EP | 2046040 A | 4/2009 |
| JP | 2005198231 A | 7/2005 |

* cited by examiner

METHOD, DEVICE AND SYSTEM FOR IMPLEMENTING VIDEO RECORDING RETRIEVAL

This application is a continuation of International Application No. PCT/CN2012/080319, filed on Aug. 17, 2012, which claims priority to Chinese Patent Application No. 201210030077.4, filed on Feb. 10, 2012, both of which are hereby incorporated by reference in their entireties.

TECHNICAL FIELD

Embodiments of the present invention relate to the field of network video surveillance services, and in particular, to a method, a device, and a system for implementing video recording retrieval.

BACKGROUND

A network video surveillance (NVS) service is a remote video surveillance service based on a broadband network. This service uses the broadband network to network scattered and separate image collection points to implement unified surveillance, unified storage, unified management, and resource sharing across regions.

In the field of video surveillance, a video surveillance system generates a large number of video recordings every day. When there is a need, surveillance personnel must retrieve valuable surveillance video recordings from massive surveillance video recording files, which may occupy a large amount of work time of the surveillance personnel. In addition, since the picture change rate of most surveillance video recordings is not high, viewing such pictures for a long time easily makes the surveillance personnel have a feeling of fatigue.

In the prior art, a user may manually generate an event through a client, and the system obtains, clips, and splices a video recording corresponding to the event according to time of the event and a camera identifier, and stores the spliced video recording and the event together for later retrieval.

The prior art has at least the following technical defects:

1) The event recorded on video is manually generated by the user through the client. If the user does not perform the operation, or the client is not started, such an event cannot be generated, and during subsequent retrieval, the video recording cannot be retrieved based on the event.

2) The system needs to download, clip, and splice the video recording from a video recording device according to data in the event, so that the video recording that meets a condition of the event is separately kept in the system. Processing time is required in the process of downloading, clipping, and splicing, resulting in a user's retrieval requirement not being met in time.

3) The processing manner of downloading, clipping, and splicing is adopted, which reduces system performance and increases overhead of system computing resources in the process of clipping and splicing.

4) Both the downloaded video recording and the original video recording are stored, which increases overhead of system storage resources.

SUMMARY OF THE INVENTION

Embodiments of the present invention provide a method, a device, and a system for implementing video recording retrieval, which can solve the problems of low retrieval efficiency, relatively high overhead of system computing resources and relatively high overhead of system storage resources in the prior art.

In one aspect, a method for implementing video recording retrieval is provided. The method includes receiving an alarm event, where the alarm event includes a device identifier of an alarm device and an alarm occurrence time. The method further includes determining a camera identifier according to the device identifier, where the camera identifier is an identifier of a camera for capturing a video recording corresponding to the alarm event, determining video recording time information of the video recording according to the alarm occurrence time, and generating a video recording bookmark and a video recording index of the video recording. The video recording bookmark includes the camera identifier and the alarm occurrence time, and the video recording index includes the video recording time information and acquisition information of the video recording. The method further includes storing the video recording bookmark and the video recording index in an associative manner, so as to subsequently retrieve the video recording bookmark according to the camera identifier and/or the alarm occurrence time included in the video recording bookmark and obtain the video recording index associated with the retrieved video recording bookmark.

In another aspect, a device for implementing video recording retrieval is provided. The device includes an alarm receiving unit, a video recording bookmark generating unit, a video recording index generating unit, and a storage unit. The alarm receiving unit is configured to receive an alarm event. The alarm event includes a device identifier of an alarm device and an alarm occurrence time. The video recording bookmark generating unit is configured to generate a video recording bookmark of a video recording corresponding to the alarm event according to the alarm event. The video recording bookmark includes a camera identifier and the alarm occurrence time, and the camera identifier is an identifier of a camera for capturing the video recording, which is determined according to the device identifier. The video recording index generating unit is configured to generate a video recording index of the video recording according to the alarm event. The video recording index includes video recording time information and video recording acquisition information, and the video recording time information is determined according to the alarm occurrence time. The storage unit is configured to store the video recording bookmark and the video recording index in an associative manner.

In another aspect, a system for implementing video recording retrieval is provided. The system includes a first device and a second device. The first device is configured to send an alarm event to the second device. The alarm event includes a device identifier of an alarm device and an alarm occurrence time. The second device is configured to receive the alarm event sent by the first device. The alarm event includes the device identifier of the alarm device and the alarm occurrence time. The second device is further configured to determine a camera identifier according to the device identifier, where the camera identifier is an identifier of a camera for capturing a video recording corresponding to the alarm event, to determine video recording time information of the video recording according to the alarm occurrence time, and to generate a video recording bookmark and a video recording index of the video recording. The video recording bookmark includes the camera identifier and the alarm occurrence time, and the video recording index includes the video recording time information and acquisition information of the video recording. The second device is further configured to store the video recording bookmark and the video recording index in an associative manner, so as to subsequently retrieve the video recording bookmark according to the camera identifier and/or the alarm occurrence time included in the video recording bookmark and to obtain the video recording index associated with the retrieved video recording bookmark.

Through the embodiments of the present invention, when an alarm event occurs, a video recording bookmark and a video recording index of a video recording corresponding to the alarm event are generated according to the alarm event. In addition, the video recording bookmark and the video recording index are stored in an associative manner, so that a user can subsequently retrieve the video recording bookmark of the video recording corresponding to the alarm event and further obtain the relevant video recording according to video recording acquisition information in the video recording index associated with the retrieved video recording bookmark. In this way, surveillance personnel can conveniently find a required surveillance video recording quickly from massive surveillance video recordings, thereby reducing the retrieval cost of the surveillance personnel and increasing the work efficiency. Moreover, the problems of relatively high overhead of system computing resources and relatively high overhead of system storage resources in the prior art can be avoided.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other embodiments from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
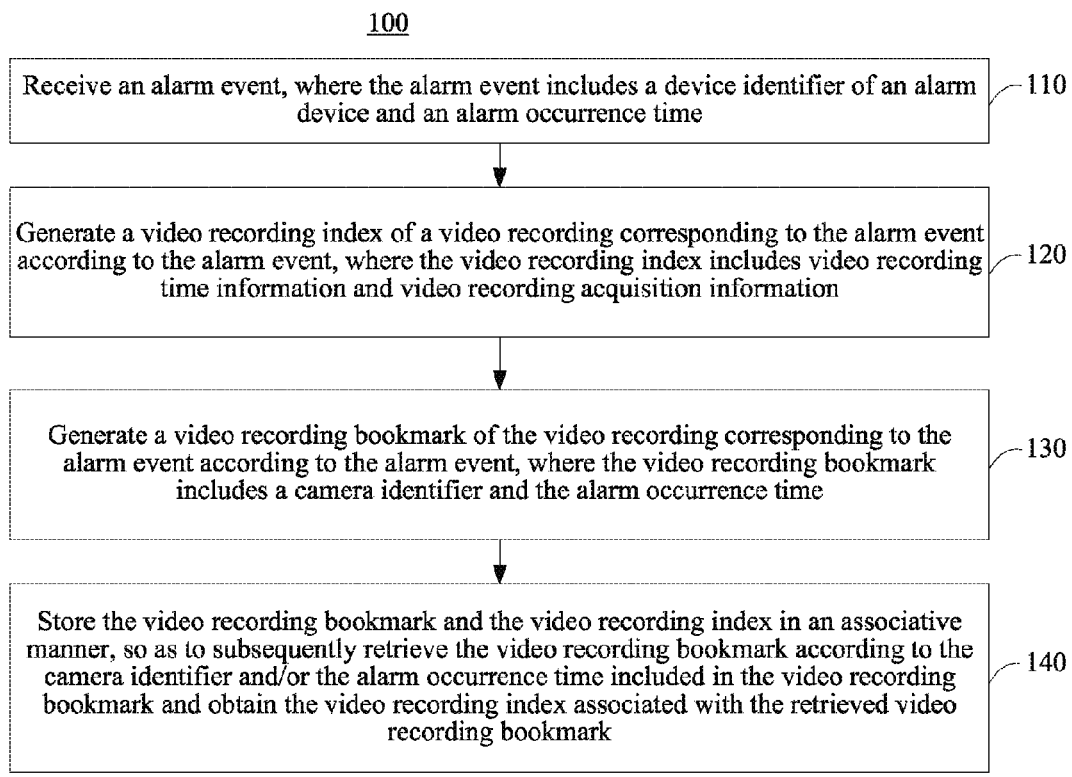
FIG. 1 is a schematic flowchart of a method for implementing video recording retrieval according to a first embodiment of the present invention.

FIG. 1 is a schematic flowchart of a method for implementing video recording retrieval according to a first embodiment of the present invention. As shown in FIG. 1, a method 100 includes the following steps.

110: Receive an alarm event, where the alarm event includes a device identifier of an alarm device and an alarm occurrence time.

Specifically, the alarm event is received by receiving an alarm message that carries the alarm event.

An alarm may be a stateful alarm, and may also be a stateless alarm. For a stateful alarm, there are two corresponding stateful alarm events, where one is an alarm start event, and the other is an alarm end event. For example, intrusion detection is a stateful alarm, where detecting that an object enters a specific area is an alarm start event, and detecting that the object leaves the specific area is an alarm end event. For a stateless alarm, there is only a corresponding alarm occurrence event, which is also called a stateless alarm event. For example, an access control alarm is a stateless alarm, where detecting that a door status switch is forcibly switched on is a stateless alarm event.

Preferably, if the alarm is a stateful alarm, the alarm event further includes indication information used for indicating whether the alarm event is an alarm start event or an alarm end event. If the alarm event is an alarm start event, the alarm occurrence time is an alarm start time; if the alarm event is an alarm end event, the alarm occurrence time is an alarm end time.

Preferably, the alarm event further includes an alarm state, where the alarm state indicates whether the alarm event is a stateful alarm event or a stateless alarm event.

The indication information and the alarm state may be respectively indicated by a parameter, and may also be indicated by a same parameter. A specific manner for indicating the indication information and the alarm state by a same parameter is as follows.

A time parameter in the alarm event is used to indicate alarm event occurrence time. A state parameter in the alarm event is used to indicate whether the alarm event is a stateful alarm event or a stateless alarm event, and is used to indicate whether the alarm event is an alarm start event or an alarm end event when the alarm event is a stateful alarm event. For example, if a value of the state parameter is start, it indicates that the alarm event is an alarm start event of a stateful alarm, and the time indicated by the time parameter is the alarm start time of the alarm corresponding to the alarm event. If the value of the state parameter is end, it indicates that the alarm event is an alarm end event of a stateful alarm, and the time indicated by the time parameter is the alarm end time of the alarm corresponding to the alarm event. If the value of the state parameter is null, it indicates that the alarm event is a stateless alarm event.

The stateful alarm includes various alarm types such as intrusion detection, lens block, and motion detection. The stateless alarm includes various alarm types such as an access control alarm, a smoke detection alarm, and detection of lost items.

Preferably, the alarm event may further include an alarm type of the alarm corresponding to the alarm event.

The alarm device may be an alarm detection device that detects the alarm event, and may specifically be an infrared device, an access control device, or the like. The device identifier of the alarm device is an identifier of the alarm detection device, such as an infrared device identifier or an access control device identifier. The alarm device may also be a camera device that captures occurrence of the alarm event, and the device identifier of the alarm device is an identifier of the camera device and may specifically be a camera identifier, where the camera identifier is an identifier of a camera that captures the surveillance video recording.

In addition, the alarm event may also be a manual alarm event. When a user (for example, a surveillance person) watches a surveillance video captured in real time or a recorded surveillance video recording on a terminal, if the user finds a surveillance picture that requires generation of an alarm event, the user may manually perform an operation to trigger generation of an alarm event. For example, the user marks an alarm occurrence time, inputs an alarm event description, and so on. The terminal generates an alarm event according to the user operation. The device identifier of the alarm device included in the alarm event is a camera identifier, and the camera identifier is an identifier of a camera that captures the surveillance video or the surveillance video recording. The alarm occurrence time included in the alarm event is the alarm occurrence time marked by the user. The alarm event may further include an alarm type, where the alarm type is a manual alarm. The user may manually perform an operation to trigger generation of a stateful alarm event, and may also respectively trigger generation of an alarm start event and that of an alarm end event by performing two operations successively, where the alarm start event and the alarm end event may be called stateful alarm events. The user may also manually perform an operation to trigger generation of an alarm event including both an alarm start time and an alarm end time, where the alarm event may also be called a stateful alarm event.

120: Generate a video recording index of a video recording corresponding to the alarm event according to the alarm event, where the video recording index includes video recording time information and video recording acquisition information.

Specifically, the video recording time information is determined according to the alarm occurrence time, and an exemplary implementation process is as follows.

The alarm event may be an alarm start event or an alarm end event of a stateful alarm. Preferably, the alarm event includes the indication information, and it is determined according to the indication information in the alarm event whether the alarm event is an alarm start event or an alarm end event. If the alarm event is an alarm start event, determining the video recording time information according to the alarm occurrence time in the alarm event is specifically determining a video recording start time of the video recording according to the alarm occurrence time in the alarm event. The video recording start time may be the alarm occurrence time, and may also be a time point earlier than the alarm occurrence time, for example, a time point 5 minutes earlier than the alarm occurrence time. If the alarm event is an alarm end event, an alarm start event that matches the alarm end event is determined, a video recording end time of the video recording corresponding to the alarm end event is determined according to the alarm occurrence time in the alarm event, and the video recording end time is recorded in a video recording index generated according to the alarm start event. The video recording end time may be the alarm occurrence time of the alarm end event, and may also be a time point later than the alarm occurrence time, for example, a time point 5 minutes later than the alarm occurrence time.

If the alarm event is a manual alarm event, and the alarm occurrence time included in the alarm event is specifically an alarm start time and an alarm end time, the video recording start time is determined according to the alarm start time and the video recording end time is determined according to the alarm end time.

Preferably, if the alarm event is a stateless alarm event, the video recording start time and the video recording end time are determined according to the alarm occurrence time, where the video recording start time may be a time point earlier than the alarm occurrence time, for example, a time point 5 minutes earlier than the alarm occurrence time, and the video recording end time may be a time point later than the alarm occurrence time, for example, a time point 5 minutes later than the alarm occurrence time.

Preferably, the alarm event includes an alarm state, and it is determined according to the alarm state whether the alarm event is a stateful alarm event or a stateless alarm event.

The video recording acquisition information is information used for obtaining a video recording associated with the alarm event, and may specifically be indicated by using location information of a server that stores the video recording and a storage path of the video recording. The location information of the server may include a server number and/or a server IP address, and the storage path may specifically be indicated by using the following form: a disk number/a storage directory/a camera number/a time directory/a video recording file name.

Preferably, the video recording index further includes a camera identifier. The camera identifier is an identifier of a camera that captures the video recording corresponding to the alarm event, and the camera identifier is determined according to the device identifier in the alarm event. An exemplary implementation process is as follows.

In a video surveillance system, an association relationship between the device identifier and the camera identifier is configured. When the alarm device identified by the device identifier detects an alarm event, the camera identified by the camera identifier associated with the device identifier starts to capture a video recording corresponding to the alarm event. A manner for determining the camera identifier may specifically be obtaining the camera identifier associated with the device identifier in the alarm event according to the device identifier in the alarm event and the configured association relationship between the device identifier and the camera identifier.

It should be noted that, if the device identifier in the alarm event is the camera identifier, the camera identifier included in a video recording bookmark of the video recording corresponding to the alarm event may be the device identifier in the alarm event. If the alarm is a manual alarm, the camera identifier included in a video recording bookmark of the video recording corresponding to the alarm event may also be the device identifier in the alarm event.

Before the video recording index is generated, if no video corresponding to the alarm event is captured, or a video corresponding to the alarm event is being captured but is not saved as a video recording, a video corresponding to the alarm event is captured and saved as a video recording. If a part of the video media has been recorded and buffered before the alarm occurrence time, this part of the video media may also be saved to the video recording. The video recording start time included in the video recording index and the time when capturing of the video recording starts to be captured may be the same, and the video recording end time included in the video recording index and the time when capturing of the video recording ends may be the same.

If the video recording corresponding to the alarm event has been captured and saved before the video recording index is generated, there is no need to start the capturing of a video recording, and the video recording index may directly be generated. The video recording start time included in the video recording index may be later than the time when capturing of the video recording starts, and the video recording end time included in the video recording index may be earlier than the time when capturing of the video recording ends.

130: Generate a video recording bookmark of the video recording corresponding to the alarm event according to the alarm event, where the video recording bookmark includes a camera identifier and the alarm occurrence time.

It should be noted that step 130 and step 120 are not performed in a particular order.

The method for determining the camera identifier included in the video recording bookmark is as described for step 120.

If the video recording index includes a camera identifier, the camera identifier included in the video recording bookmark is the same as the camera identifier included in the video recording index. Optionally, the camera identifier may be determined respectively in step 120 or step 130. Optionally, if step 120 is performed before step 130, the camera identifier may be determined in step 120, and the camera identifier may be added directly to the video recording bookmark in step 130. If step 130 is performed before step 120, the camera identifier may be determined in step 130, and the camera identifier may be added directly to the video recording index in step 120.

Preferably, the alarm event further includes an alarm type, and the video recording bookmark generated according to the alarm event includes the alarm type, so that subsequently a user (for example, a surveillance person) retrieves the video recording corresponding to the video recording bookmark according to the alarm type.

Preferably, the video recording bookmark generated according to the alarm event includes the device identifier, so that subsequently a user (for example, a surveillance person) retrieves the video recording corresponding to the video recording bookmark according to the device identifier.

The alarm occurrence time included in the video recording bookmark is the alarm occurrence time in the alarm event.

If the alarm event is a stateless alarm event, the video recording bookmark includes one alarm occurrence time, and the alarm occurrence time in the alarm event is recorded as the alarm occurrence time in the video recording bookmark.

If the alarm event is a stateful alarm event, the video recording bookmark includes two alarm occurrence times, where one is an alarm start time, and the other is an alarm end time. Preferably, the alarm event includes the indication information, and it is determined according to the indication information in the alarm event whether the alarm event is an alarm start event or an alarm end event. If the alarm event is an alarm start event, the alarm occurrence time in the alarm event is recorded as the alarm start time in the video recording bookmark. If the alarm event is an alarm end event, an alarm start event that matches the alarm end event is determined, the alarm occurrence time included in the alarm event is determined as the alarm end time, and the alarm end time is recorded into a video recording bookmark generated according to the alarm start event. If the alarm event is a manual alarm event, and the alarm occurrence time included in the alarm event is specifically an alarm start time and an alarm end time, the alarm start time and the alarm end time are recorded in the video recording bookmark.

Preferably, the alarm event includes an alarm state, and it is determined according to the alarm state whether the alarm event is a stateful alarm event or a stateless alarm event.

An exemplary implementation process for determining an alarm start event that matches the alarm end event in step 120 and step 130 is as follows.

According to the identifier of the alarm detection device, the alarm occurrence time, the alarm type, and the indication information in the alarm end event, the alarm start event corresponding to the alarm end event is matched. For example, an alarm event meeting the following conditions is considered as the alarm start event that matches the alarm end event: 1. the alarm event is an alarm start event; 2. the identifier of the alarm detection device corresponding to the alarm event is the same as an identifier of an alarm detection device corresponding to the alarm end event; 3. the alarm type of the alarm event is the same as an alarm type of the alarm end event; 4. the alarm event is the latest one among all events that meet the foregoing three conditions and occur before the alarm end event.

A specific manner for determining an alarm start event that matches the alarm end event and obtaining the video recording bookmark and/or the video recording index generated according to the alarm start event is as follows.

It may be that all alarm events that occurred previously and are used for generating video recording bookmarks and video recording indexes are recorded and matching is performed among the recorded alarm events. Preferably, association relationships between the alarm events and the video recording bookmarks generated according to the alarm events and association relationships between the alarm events and the video recording indexes generated according to the alarm events are also recorded. After the alarm start event that matches the alarm end event is matched, the video recording bookmark generated according to the alarm start event is obtained according to the association relationships between the alarm events and the video recording bookmarks generated according to the alarm events. Also, the video recording index generated according to the alarm start event is obtained according to the association relationships between the alarm events and the video recording indexes generated according to the alarm events.

It may be that matching is performed among recorded video recording bookmarks that correspond to stateful alarm events that include the event start time, but exclude the event end time. The video recording bookmark generated according to the alarm start event that matches the alarm end event is matched, that is, the alarm start event that matches the alarm end event is matched, and then the video recording index may be obtained according to the association relationship between the video recording bookmark and the video recording index generated according to the alarm start event.

It may also be that matching is performed among recorded video recording indexes that correspond to stateful alarm events that include the video recording start time, but exclude the video recording end time. The video recording index generated according to the alarm start event that matches the alarm end event is matched, that is, the alarm start event that matches the alarm end event is matched, and then the video recording bookmark may be obtained according to the association relationship between the video recording index and the video recording bookmark generated according to the alarm start event.

In both step 120 and step 130, an alarm start event that matches the alarm end event may be determined according to the foregoing exemplary implementation process.

Optionally, if step 120 is performed before step 130, an alarm start event that matches the alarm end event may be determined in step 120 according to the foregoing exemplary implementation process, and in step 130, the alarm start event determined in step 120 may directly be considered as the alarm start event that matches the alarm end event. If step 130 is performed before step 120, an alarm start event that matches the alarm end event may be determined in step 130 according to the foregoing exemplary implementation process, and in step 120, the alarm start event determined in step 130 may directly be considered as the alarm start event that matches the alarm end event.

140: Store the video recording bookmark and the video recording index in an associative manner, so as to subsequently retrieve the video recording bookmark according to the camera identifier and/or the alarm occurrence time included in the video recording bookmark and obtain the video recording index associated with the retrieved video recording bookmark.

The storing the video recording bookmark and the video recording index in an associative manner may specifically be assigning an identifier to the video recording index, where the identifier of the video recording index is included in the video recording bookmark. It may also specifically be taking other data except the camera identifier in the video recording index as a part of the video recording bookmark. It may also specifically be respectively assigning an identifier to the video recording bookmark and the video recording index, and recording an association relationship between the identifier of the video recording bookmark and the identifier of the video recording index.

It should be noted that, if there is more than one camera that captures the video recording associated with the alarm event, one video recording index and one video recording bookmark may be generated for the video recording captured by each camera, and the video recording index and the video recording bookmark are stored in an associative manner.

Figure 2:
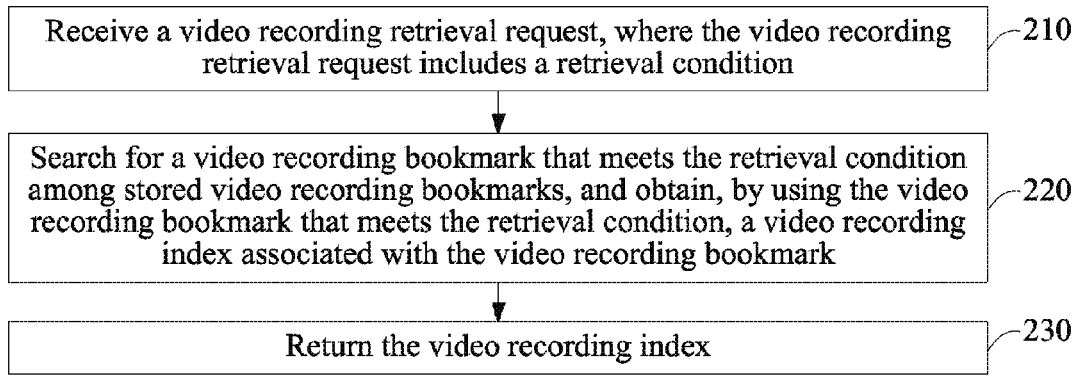
FIG. 2 is a schematic flowchart of a method for implementing video recording retrieval according to a second embodiment of the present invention.

FIG. 2 is a schematic flowchart of a method for implementing video recording retrieval according to a second embodiment of the present invention.

As shown in FIG. 2, the method 200 includes the following steps.

210: Receive a video recording retrieval request, where the video recording retrieval request includes a retrieval condition.

The retrieval condition specifically includes a camera identifier, and/or alarm time information, and/or an alarm type, and/or an alarm device identifier, and/or a video recording bookmark identifier.

The camera identifier as the retrieval condition is used for retrieving a video recording captured by a camera identified by the camera identifier. The alarm time information as the retrieval condition, where the alarm time information may be a time segment, is used for retrieving a video recording corresponding to an alarm event that occurs within the alarm time segment. The alarm type as the retrieval condition is used for retrieving a video recording corresponding to an alarm event whose alarm type is the alarm type. The alarm device identifier as the retrieval condition is used for retrieving a video recording corresponding to an alarm event generated by a device identified by the alarm device identifier. The video recording bookmark identifier is used for obtaining a video recording corresponding to a video recording bookmark identified by the video recording bookmark identifier.

220: Search for a video recording bookmark that meets the retrieval condition among stored video recording bookmarks, and obtain, by using the video recording bookmark that meets the retrieval condition, a video recording index associated with the video recording bookmark.

230: Return the video recording index. Preferably, the video recording bookmark and the video recording index are returned.

It should be noted that, if there is no video recording bookmark that meets the retrieval condition, it is indicated in a return message that there is no video recording that meets the retrieval condition. In addition, there may be more than one video recording bookmark and more than one video recording index associated with the video recording bookmark.

After receiving the video recording index, a terminal that initiates the retrieval request displays the video recording index on a screen of the terminal. Subsequently, the terminal may obtain the video recording according to video recording acquisition information included in the video recording index. The terminal may automatically start playing the video recording at a video recording start time included in the video recording index and stop playing the video recording at a video recording end time included in the video recording index, and may also mark the video recording start time and the video recording end time on a playback progress bar of the video recording.

It should be noted that the second embodiment of the present invention may be combined with the first embodiment of the present invention.

According to the first embodiment of the present invention, a third embodiment of the present invention provides a device for implementing video recording retrieval, which is used to implement the foregoing method for implementing video recording retrieval.

Figure 3:
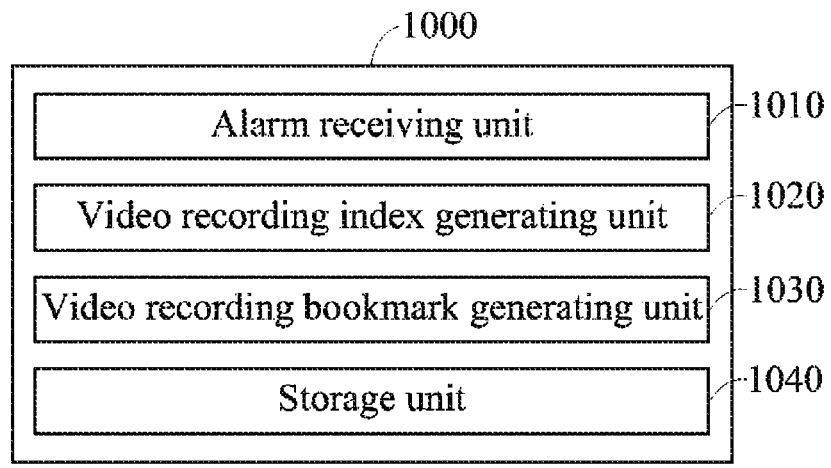
FIG. 3 is a schematic structural diagram of a device for implementing video recording retrieval according to a third embodiment of the present invention.

As shown in FIG. 3, a device 1000 for implementing video recording retrieval includes an alarm receiving unit 1010, a video recording index generating unit 1020, a video recording bookmark generating unit 1030, and a storage unit 1040. The alarm receiving unit 1010 is configured to receive an alarm event, where the alarm event includes a device identifier of an alarm device and an alarm occurrence time. The video recording index generating unit 1020 is configured to generate a video recording index of a video recording corresponding to the alarm event according to the alarm event, where the video recording index includes video recording time information and video recording acquisition information. The video recording index generating unit 1020 is further configured to determine the video recording time information according to the alarm occurrence time. For a specific function implementation of the video recording index generating unit, refer to step 120 in the first embodiment of the present invention.

The video recording bookmark generating unit 1030 is configured to generate a video recording bookmark of the video recording corresponding to the alarm event according to the alarm event. The video recording bookmark includes a camera identifier and the alarm occurrence time, and the camera identifier is an identifier of a camera for capturing the video recording, which is determined according to the device identifier. For a specific function implementation of the video recording bookmark generating unit, refer to step 130 in the first embodiment of the present invention. The storage unit 1040 is configured to store the video recording bookmark and the video recording index in an associative manner. For a specific function implementation of the storage unit, refer to step 140 in the first embodiment of the present invention.

Preferably, the alarm event further includes indication information used for indicating whether the alarm event is an alarm start event or an alarm end event.

The video recording index generating unit is further configured to determine that the alarm event is an alarm end event according to the indication information and determine an alarm start event that matches the alarm end event. The video recording index generating unit is further configured to determine a video recording end time of the video recording corresponding to the alarm end event according to the alarm occurrence time in the alarm event and record the video recording end time in a video recording index generated according to the alarm start event.

The video recording bookmark is further configured to determine that the alarm event is an alarm end event according to the indication information and to determine an alarm start event that matches the alarm end event. It is further configured to record the alarm occurrence time of the alarm end event in a video recording bookmark generated according to the alarm start event.

Preferably, the alarm receiving unit sends a received alarm event to the video recording index generating unit, obtains, from the video recording index generating unit, a video recording index that is generated by the video recording index generating unit according to the alarm event, and sends the alarm event and the video recording index to the video recording bookmark generating unit. The video recording bookmark generating unit generates a video recording bookmark according to the alarm event and sends the video recording index and the video recording bookmark to the storage unit. The storage unit stores the video recording index and the video recording bookmark in an associative manner.

According to the second embodiment of the present invention, a fourth embodiment of the present invention provides a device for implementing video recording retrieval, which is used to implement the foregoing method for implementing video recording retrieval.

Figure 4:
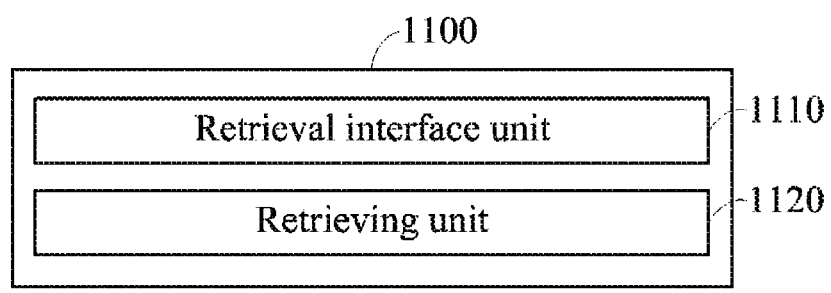
FIG. 4 is a schematic structural diagram of a device for implementing video recording retrieval according to a fourth embodiment of the present invention.

As shown in FIG. 4, a device 1100 for implementing video recording retrieval includes a retrieval interface unit 1110 and a retrieving unit 1120. The retrieval interface unit 1110 is configured to receive a video recording retrieval request, where the video recording retrieval request includes a retrieval condition, and the retrieval condition specifically includes a camera identifier, and/or alarm time information, and/or an alarm type, and/or an alarm device identifier, and/or a video recording bookmark identifier. The retrieving unit 1120 is configured to search for a video recording bookmark that meets the retrieval condition among stored video recording bookmarks, and to obtain, by using the video recording bookmark that meets the retrieval condition, a video recording index associated with the video recording bookmark. The retrieval interface unit is further configured to return the video recording index.

It should be noted that the fourth embodiment of the present invention may be combined with the third embodiment of the present invention.

The device for implementing video recording retrieval according to the third or fourth embodiment of the present invention can be implemented by using electronic hardware or a combination of computer software and electronic hardware. If the device is implemented by using a combination of computer software and electronic hardware, specifically, the device may be implemented by running a computer program on a computer, where running the computer program on the computer may implement the method according to the first or second embodiment of the present invention. The computer includes but is not limited to a PC, a server, a PAD, and a portable notebook computer.

A system of the computer includes a processor and a memory. The memory is configured to store a computer program, where the computer program includes computer operating instructions. The computer operating instructions include computer operating instructions used for implementing functions of the units of the device for implementing video recording retrieval that is provided by the third or fourth embodiment of the present invention. The memory is specifically a volatile memory.

The processor is configured to execute the computer program stored in the memory and is specifically configured to execute the computer operating instructions included in the computer program, so as to implement the functions of the units of the device for implementing video recording retrieval that is provided by the third or fourth embodiment of the present invention. The processor is a central processing unit (CPU) and is a core unit of the computer.

According to the first embodiment and the third embodiment of the present invention, a fifth embodiment of the present invention provides a system for implementing video recording retrieval, which is used to implement the foregoing method for implementing video recording retrieval.

Figure 5:
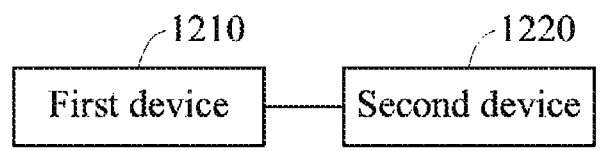
FIG. 5 is a schematic structural diagram of a system for implementing video recording retrieval according to a fifth embodiment of the present invention.

As shown in FIG. 5, the system for implementing video recording retrieval includes a first device 1210 and a second device 1220. The first device 1210 is configured to send an alarm event to the second device 1220. The alarm event includes a device identifier of an alarm device and an alarm occurrence time. An exemplary implementation process of the first device 1210 is as described in step 110 of the first embodiment of the present invention. The second device 1220 is specifically the device described in the third embodiment.

According to the second embodiment of the present invention, a sixth embodiment of the present invention provides a system for implementing video recording retrieval, which is used to implement the foregoing method for implementing video recording retrieval.

Figure 6:
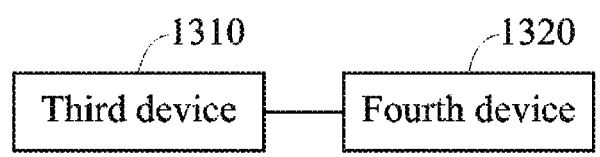
FIG. 6 is a schematic structural diagram of a system for implementing video recording retrieval according to a sixth embodiment of the present invention.

As shown in FIG. 6, the system for implementing video recording retrieval includes a third device 1310 and a fourth device 1320. The third device 1310 is configured to send a video recording retrieval request to the fourth device 1320, and after receiving a returned video recording index, to display the video recording index on a screen of the third device 1310. An exemplary implementation process of the third device 1310 is as described in the second embodiment of the present invention. The fourth device 1320 is specifically the device described in the fourth embodiment.

It should be noted that the sixth embodiment of the present invention may be combined with the fifth embodiment of the present invention.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that to achieve the purpose of a convenient and brief description, for a detailed working process of the foregoing devices and units, reference may be made to a corresponding process in the foregoing method embodiments, and details are not described herein again.

In the embodiments provided in the present application, it should be understood that the disclosed devices and methods may be implemented in other manners. For example, the described device embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for implementing video recording retrieval, the method comprising:
    receiving a first alarm event, wherein the first alarm event comprises a device identifier of a first alarm device, a first alarm occurrence time, and first indication information that indicates that the first alarm event is an alarm start event;
    determining a camera identifier according to the device identifier of the first alarm device, wherein the camera identifier is an identifier of a camera for capturing a video recording corresponding to the first alarm event;
    determining that the first alarm event is an alarm start event according to the first indication information;
    determining video recording time information of the video recording according to the first alarm occurrence time;
    generating a first video recording bookmark and a first video recording index of the video recording, wherein the first video recording bookmark comprises the camera identifier and the first alarm occurrence time, wherein the first video recording index comprises the video recording time information and acquisition information of the video recording, and wherein the acquisition information is information configured for obtaining a video recording associated with the first alarm event and is indicated by using location information of a server that stores the video recording and a storage path of the video recording; and
    storing the first video recording bookmark and the first video recording index in an associative manner, so as to subsequently retrieve the first video recording bookmark according to the camera identifier and/or the first alarm occurrence time comprised in the first video recording bookmark and to obtain the first video recording index associated with the retrieved first video recording bookmark;
    receiving a second alarm event, wherein the second alarm event comprises a device identifier of a second alarm device, a second alarm occurrence time, and second indication information that indicates that the second alarm event is an alarm end event;
    determining that the second alarm event is an alarm end event according to the second indication information;
    determining a second alarm start event that matches the second alarm event;
    determining a video recording end time of a video recording corresponding to the second alarm event according to the second alarm occurrence time;
    recording the video recording end time into a second video recording index generated according to the second alarm start event that matches the second alarm event;
    determining a third alarm occurrence time comprised in a second video recording bookmark generated according to the second alarm start event as a second alarm start time;
    determining the second alarm occurrence time comprised in the second alarm event as a second alarm end time; and
    recording the second alarm end time into the second video recording bookmark generated according to the second alarm start event.

2. The method according to claim 1, wherein:
the first alarm event is a stateless alarm event.

3. The method according to claim 1, wherein:
the first alarm event and the second alarm event each further comprise an alarm type; and
determining the second alarm start event that matches the second alarm event comprises determining the second alarm start event that matches the second alarm event according to the first indication information, the second indication information, the device identifier of the first alarm device, the device identifier of the second alarm device, the alarm type of the first alarm event, the alarm type of the second alarm event, the first alarm occurrence time, and the second alarm occurrence time.

4. The method according to claim 1, wherein storing the first video recording bookmark and the first video recording index in the associative manner comprises:
    storing the first video recording bookmark and assigning a bookmark identifier to the first video recording bookmark;
    storing the first video recording index and assigning an index identifier to the first video recording index; and
    recording an association relationship between the bookmark identifier and the index identifier.

5. The method according to claim 1, wherein storing the first video recording bookmark and the first video recording index in the associative manner comprises:
    storing the first video recording index and assigning an identifier to the first video recording index;
    recording the identifier of the first video recording index into the first video recording bookmark; and
    storing the first video recording bookmark.

6. The method according to claim 1, wherein storing the first video recording bookmark and the first video recording index in the associative manner comprises:
recording the first video recording time information and the acquisition information of the video recording comprised in the first video recording index into the first video recording bookmark; and
storing the first video recording bookmark.

7. The method according to claim 1, wherein determining the camera identifier according to the device identifier of the first alarm device comprises obtaining the camera identifier associated with the device identifier of the first alarm device from a stored association relationship between the device identifier of the first alarm device and the camera identifier.

8. The method according to claim 1, wherein the first alarm event further comprises an alarm type, and the device identifier of the first alarm device and/or the alarm type comprised in the first alarm event is recorded into the first video recording bookmark, so as to subsequently retrieve the first video recording bookmark according to any combination of the camera identifier, the first alarm occurrence time, the device identifier of the first alarm device, and the alarm type of the first alarm event, and to obtain the first video recording index associated with the retrieved first video recording bookmark.

9. The method according to claim 1, further comprising:
receiving a video recording retrieval request, wherein the video recording retrieval request comprises a retrieval condition, and wherein the retrieval condition specifically comprises a requested camera identifier, and/or requested alarm time information, and/or a requested alarm type, and/or a requested alarm device identifier, and/or a requested video recording bookmark identifier;
searching for a requested video recording bookmark that meets the retrieval condition among stored video recording bookmarks;
obtaining, by using the requested video recording bookmark that meets the retrieval condition, a requested video recording index associated with the requested video recording bookmark; and
returning the requested video recording index.

10. A system for implementing video recording retrieval, the system comprising:
a first device, configured to send a first alarm event to a second device, wherein the first alarm event comprises a device identifier of a first alarm device and a first alarm occurrence time, wherein the second device comprises:
a computer;
a non-transitory computer-readable medium storing program units executable by the computer, the units including:
an alarm receiving unit, configured to receive the first alarm event;
a first video recording index generating unit, configured to generate a first video recording index of a video recording corresponding to the first alarm event according to the first alarm event, wherein the first video recording index comprises video recording time information and video recording acquisition information, the video recording time information is determined according to the first alarm occurrence time; and wherein the acquisition information is information configured for obtaining a video recording associated with the first alarm event and is indicated by using location information of a server that stores the video recording corresponding to the first alarm event and a storage path of the video recording; and
a first video recording bookmark generating unit, configured to generate a first video recording bookmark of the video recording corresponding to the first alarm event according to the first alarm event, wherein the video recording bookmark comprises a camera identifier and the first alarm occurrence time, and the camera identifier is an identifier of a camera for capturing the video recording corresponding to the first alarm event and is determined according to the device identifier of the first alarm device;
wherein the non-transitory computer-readable medium is further configured to store the first video recording bookmark and the first video recording index in an associative manner: and
a third device, configured to send a video recording retrieval request to a fourth device, and to display, after receiving a second video recording index returned by the fourth device, the second video recording index on a screen of the third device, wherein the fourth device comprises a computer including a non-transitory computer-readable medium storing program units executable by the computer, the units including:
a second alarm receiving unit, configured to receive a second alarm event, wherein the second alarm event comprises a second device identifier of a second alarm device and a second alarm occurrence time;
a second video recording index generating unit, configured to generate a second video recording index of a second video recording corresponding to the second alarm event according to the second alarm event, wherein the second video recording index comprises second video recording time information and second video recording acquisition information, and wherein the second video recording time information is determined according to the second alarm occurrence time;
a second video recording bookmark generating unit, configured to generate a second video recording bookmark of the second video recording corresponding to the second alarm event according to the second alarm event, wherein the second video recording bookmark comprises a second camera identifier and the second alarm occurrence time, and wherein the second camera identifier is an identifier of a camera for capturing the second video recording and is determined according to the second device identifier;
a retrieval interface unit, configured to receive a video recording retrieval request, wherein the video recording retrieval request comprises a retrieval condition, and the retrieval condition specifically comprises a requested camera identifier, and/or requested alarm time information, and/or a requested alarm type, and/or a requested device identifier; and
a retrieving unit, configured to search for a video recording bookmark that meets the retrieval condition among stored video recording bookmarks, and to obtain, by using a requested video recording bookmark that meets the retrieval condition, a third video recording index associated with the requested video recording bookmark,
wherein the retrieval interface unit is further configured to return the third video recording index, and wherein the non-transitory computer-readable medium is configured to store the second video recording bookmark and the second video recording index in an associative manner.

* * * * *